US 9,090,394 B2

(12) United States Patent
Peisley et al.

(10) Patent No.: US 9,090,394 B2
(45) Date of Patent: Jul. 28, 2015

(54) INSULATED BAG FOR HOLDING CAPE OF BIG GAME ANIMAL

(71) Applicants: Robert W. Peisley, South Jordan, UT (US); Brock Hadley, Herriman, UT (US)

(72) Inventors: Robert W. Peisley, South Jordan, UT (US); Brock Hadley, Herriman, UT (US)

( * ) Notice: Subject to any disclaimer, the term of this patent is extended or adjusted under 35 U.S.C. 154(b) by 0 days.

(21) Appl. No.: 14/037,061

(22) Filed: Sep. 25, 2013

(65) Prior Publication Data

US 2014/0166714 A1  Jun. 19, 2014

Related U.S. Application Data

(60) Provisional application No. 61/705,276, filed on Sep. 25, 2012.

(51) Int. Cl.
| | |
|---|---|
| A45F 3/04 | (2006.01) |
| F25D 3/08 | (2006.01) |
| B65D 81/24 | (2006.01) |
| A01M 31/00 | (2006.01) |

(52) U.S. Cl.
CPC . *B65D 81/24* (2013.01); *A45F 3/04* (2013.01); *A01M 31/006* (2013.01); *F25D 3/08* (2013.01); *F25D 2331/8011* (2013.01)

(58) Field of Classification Search
CPC ..................................................... A01M 31/006
USPC .......... 224/647, 236, 237, 655, 650; 206/485; 220/826, 601
See application file for complete search history.

(56) References Cited

U.S. PATENT DOCUMENTS

| | | | | |
|---|---|---|---|---|
| 2,764,327 | A * | 9/1956 | Stevenson | 224/635 |
| 5,092,506 | A * | 3/1992 | Bolduc | 224/658 |
| 6,053,382 | A * | 4/2000 | Wyant | 224/153 |
| 6,135,333 | A * | 10/2000 | Tucker et al. | 224/646 |
| 6,253,569 | B1 * | 7/2001 | Hall | 62/457.2 |
| 6,409,066 | B1 * | 6/2002 | Schneider et al. | 224/585 |
| 6,510,705 | B1 * | 1/2003 | Jackson | 62/457.2 |
| 7,634,919 | B2 * | 12/2009 | Bernhard et al. | 62/371 |
| 2003/0057239 | A1 * | 3/2003 | Godshaw | 224/153 |
| 2009/0032562 | A1 * | 2/2009 | Glass | 224/577 |
| 2011/0036849 | A1 * | 2/2011 | Sturrock | 220/592.2 |
| 2012/0145720 | A1 * | 6/2012 | Hicks | 220/592.2 |
| 2014/0353351 | A1 * | 12/2014 | Armstrong | 224/600 |

* cited by examiner

*Primary Examiner* — Justin Larson
(74) *Attorney, Agent, or Firm* — Clayton, Howarth & Cannon, P.C.

(57) ABSTRACT

An insulated bag for protecting the cape of a big game animal. The bag comprises a top panel having at least one port for accommodating the antlers of the big game animal. Pockets formed in the interior of the bag can be utilized to prevent the cape of the animal from degrading.

19 Claims, 6 Drawing Sheets

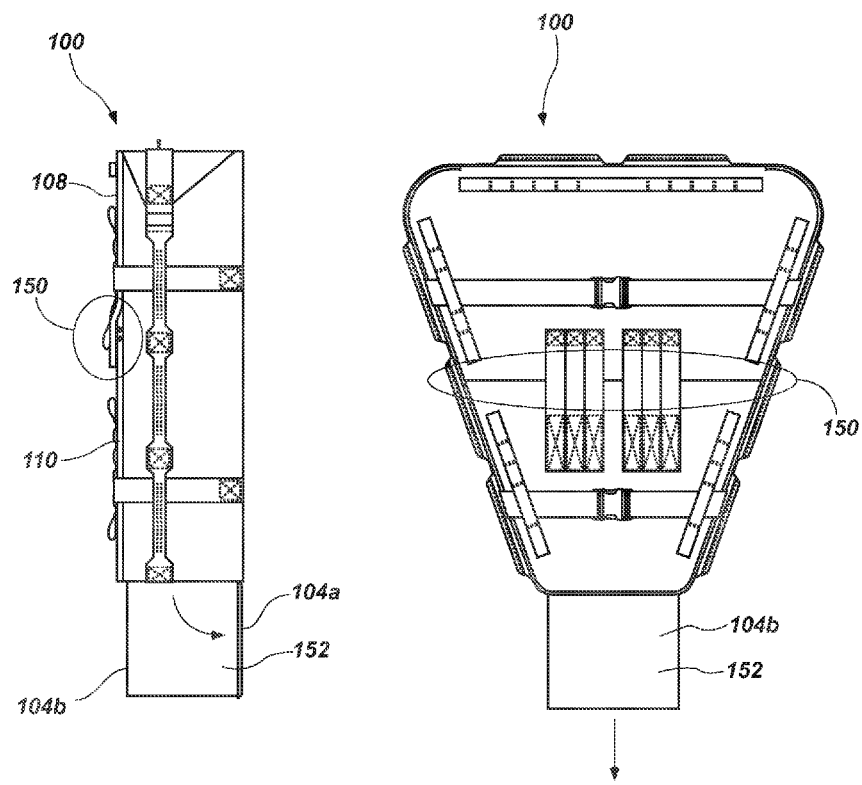
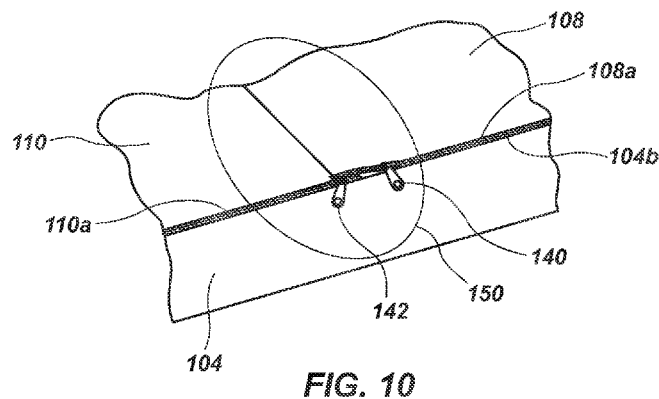

INSULATED BAG FOR HOLDING CAPE OF BIG GAME ANIMAL

CROSS-REFERENCE TO RELATED APPLICATIONS

This application claims the benefit of U.S. Provisional Application No. 61/705,276, filed Sep. 25, 2012 which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Present Disclosure

The present disclosure relates generally to hunting equipment, and more particularly, but not necessarily entirely, to containers for holding capes and skulls of big game animals.

2. Description of Related Art

After downing a big game animal, hunters often "cape" the animal in order to preserve the animal's cape for a taxidermy mount. The cape of a big game animal typically refers to the head, and antlers, and shoulder skin or hide of the animal. In addition, big game hunters often wish to preserve the skull and antlers of the animal. To cape an animal, skin around the shoulder, front legs, chest, and neck are carefully cut away from the flesh. The head, with any antlers still attached, is also typically removed during this process and remains attached to, and part of, the cape. (Alternatively, the hide may be removed from the head.)

Once an animal has been caped, proper care of the cape is essential. In particular, the biggest problem is ensuring that the cape does not begin to rot. This is often a challenge when a big game animal is downed in remote areas during hot weather. The best way to prevent rotting, is to cool the cape as quickly as possible. However, in the past, this has been a challenge due to the odd shape of the cape, head, and antlers. That is, the shape of the cape, head and antlers prevents it from being easily placed in a cooler. As used herein, The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 8 is a side view of the bag shown in FIG. 1 having a nose panel operated to an open position;

FIG. 9 is a front view of the bag shown in FIG. 1 having a nose panel operated to an open position;

FIG. 10 is a partial, fragmentary view of a zipper connection between a first panel and a second panel of the bag shown in FIG. 1 according to an embodiment of the present disclosure;

DETAILED DESCRIPTION

Figure 1:
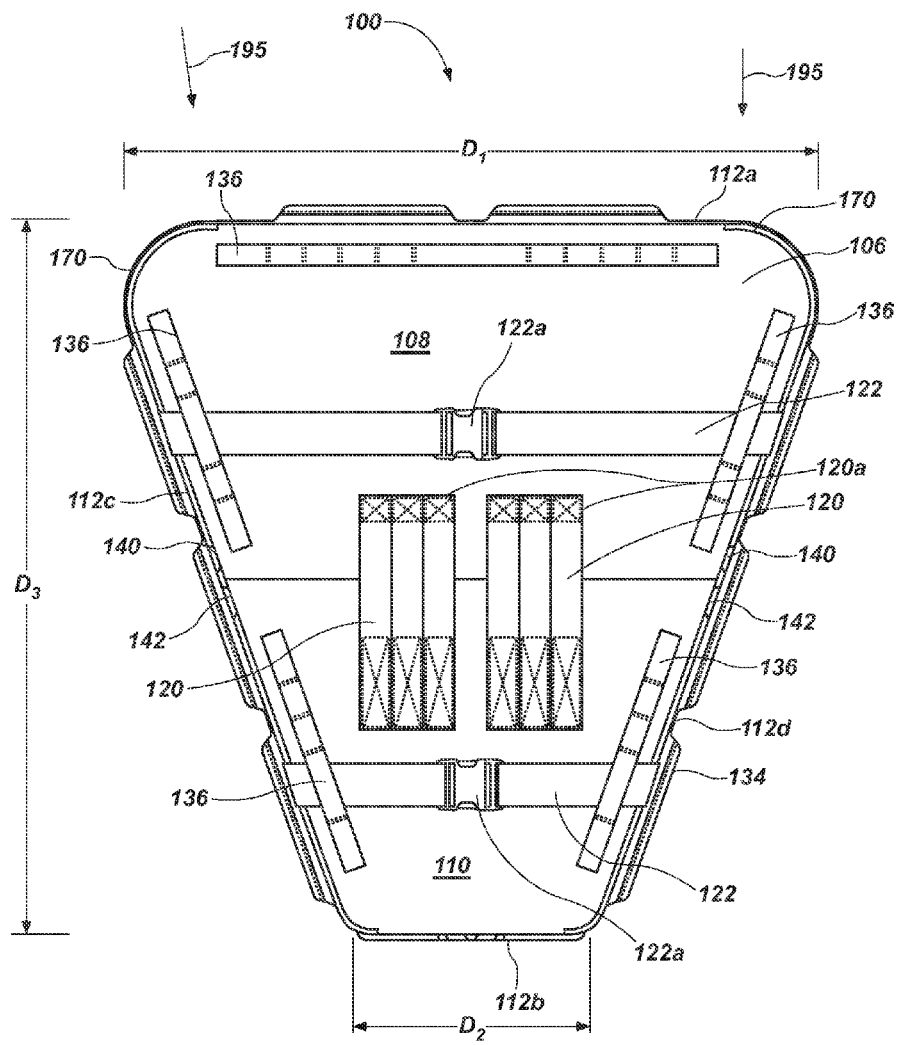
FIG. 1 is a front view of an bag according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "comprising," "including," "containing," "having," "characterized by," and grammatical equivalents thereof are inclusive or open-ended terms that do not exclude additional, unrecited elements or method steps.

Referring now to FIG. 1, there is depicted a bag 100 for holding a cape of a big game animal pursuant to an embodiment of the present disclosure. The bag 100 may comprise a front panel 106. The front panel 106 may include a top edge 112a, a bottom edge 112b, a first side edge 112c, and a second side edge 112d. The top edge 112a may define a width, $D_1$. The bottom edge 112b may define a width, $D_2$. In an embodiment, $D_1$ is greater than $D_2$ such that the front panel 106 tapers from the top edge 112a to the bottom edge 112b such that the bag 100 has a general wedge shape. A length, $D_3$, may define a distance between the top edge 112a and the bottom edge 112b of the bag 100.

In an embodiment, the width, $D_1$, may be about 33 inches, or between 30 to 36 inches. In an embodiment, the width, $D_1$, may be about 24 inches, or between 18 to 30 inches. In an embodiment, the width, $D_2$, may be about 11 inches, or between 8 to 14 inches. In an embodiment, the distance, $D_3$, may be about 28 inches, or between 20 to 38 inches.

Disposed on the front panel 106 of the bag 100 may be daisy chain tie downs 136. In particular, each of the tie downs 136 may include a strip or strap that includes spaced apart loops. It will be appreciated that the tie downs 136 provide anchor points for additional cords or ropes.

Further, secured on the side edges 112c and 112d may be ends of straps 122. The straps 122 may extend horizontally across the front panel 106. Each of the straps 122 include a buckle 122a. In particular, each buckle 122a may include a female portion and male portion that are joined in a snap-fit. Further, the female portion and male portion of the straps 122 may allow the straps to be tightened by a U-cinch as known to those of ordinary skill. In an embodiment, the buckles 122a may be formed of plastic.

Figures 6, 7:
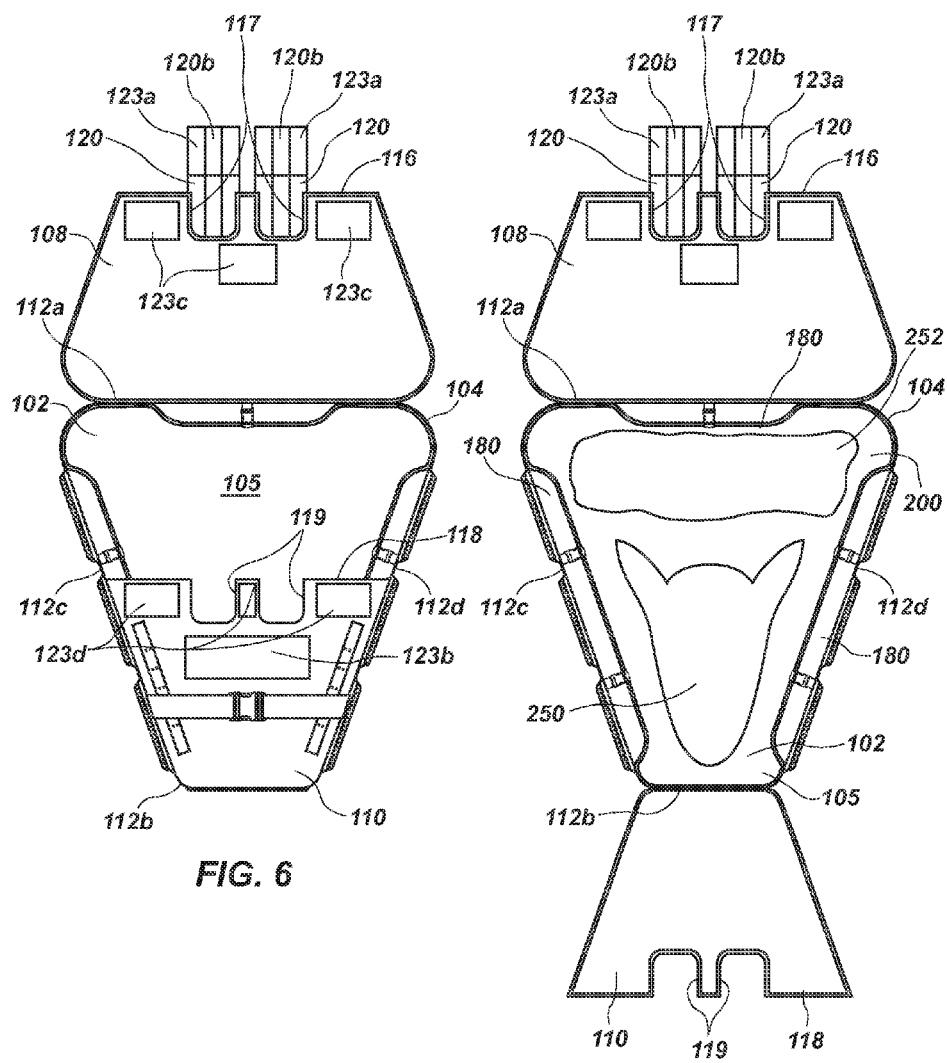
FIG. 6 is a front view of the bag shown in FIG. 1 having a first panel operated to an open position and a second panel operated to a closed position according to an embodiment of the present disclosure.
FIG. 7 is a front view of the bag shown in FIG. 1 having a first panel operated to an open position and a second panel operated to a an open position according to an embodiment of the present disclosure.

As perhaps best seen in FIGS. 1, 6 and 7, the front panel 106 of the bag 100 may comprise a first panel 108 and a second panel 110. The first panel 108 may be secured along the top edge 112a by a living hinge such that the first panel 108 may be operable between a closed position (FIG. 1) and an open position (FIGS. 6 and 7). The second panel 110 may be secured along the bottom edge 112b by a living hinge such that the second panel 110 may be operable between a closed position (FIGS. 1 and 6) and an open position (FIG. 7). In an embodiment, zippers 140 may be utilized to secure the first panel 108 in the closed position. In an embodiment, zippers 142 may also be utilized to secure the second panel 110 in the closed position.

Referring now to FIGS. 6 and 7, a terminal edge 116 of the first panel 108 may include a pair of notches 117. Likewise, a terminal edge 118 of the second panel 110 may have formed therein a pair of notches 119. Referring now to FIGS. 1, 6 and 7, a plurality of securing straps or webbing 120 may be secured adjacent the notches 117 of the first panel 108. In particular, a first end 120a of the straps 120 may be secured to an outer surface of the first panel 108 (FIG. 1). For example, the first end 120a of the straps 120 may be secured by stitches to the first panel 108. An underside of free ends 120b of the straps 120 (FIGS. 6 and 7) may include a securing member 123a. The securing members 123a of the straps 120 may engage a securing member 123b disposed on the second panel 110 (FIG. 6).

In an embodiment, the securing members 123a and 123b may comprise a hook and loop fastener. It will be appreciated that the straps 120 may be utilized to secure antlers extending from the notches 117 and 119 when the first panel 108 and the second panel 110 are both in the closed position as shown in FIG. 1.

In an embodiment, the inner side of the first panel 108 (FIGS. 6 and 7) may include a securing member 123c configured and adapted to engage a securing member 123d disposed on the outer side of the second panel 110 (FIG. 6). In an embodiment, the securing members 123c and 123d may comprise a hook and loop fastener. It will be appreciated that the first panel 108 may overlap the second panel 110 when they are in the closed position as shown in FIG. 1 such that the notches 117 and 119 also overlap each other to form a pair of antler ports.

Figure 2:
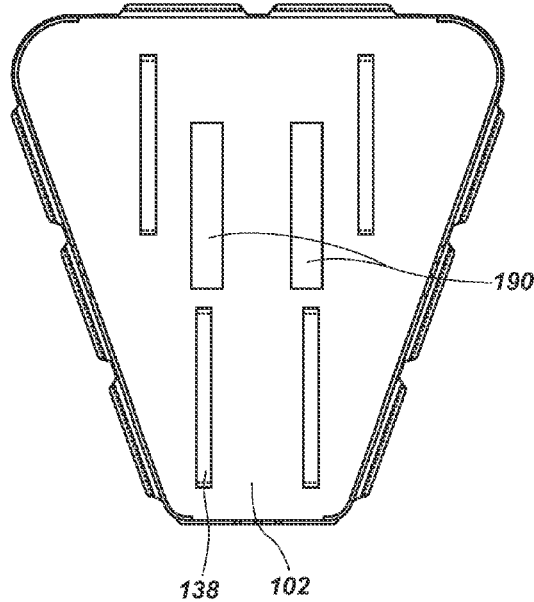
FIG. 2 is a back view of the bag shown in FIG. 1 according to an embodiment of the present disclosure.

Referring now to FIG. 2, the bag 100 may include a rear panel 102 having plastic sliders 138. Also disposed on the rear panel 102 may be shoulder straps 190 that allow the bag 100 to be carried like a backpack. The straps 190 may be adjustable in length to accommodate users of various sized. In addition, a belt strap (not shown) may be utilized when the bag 100 is employed as a backpack.

Figure 3:
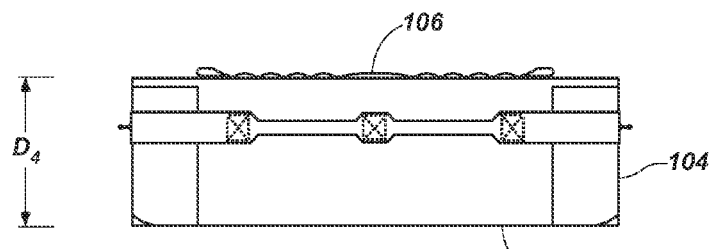
FIG. 3 is a top view of the bag shown in FIG. 1 according to an embodiment of the present disclosure.
Figure 5:
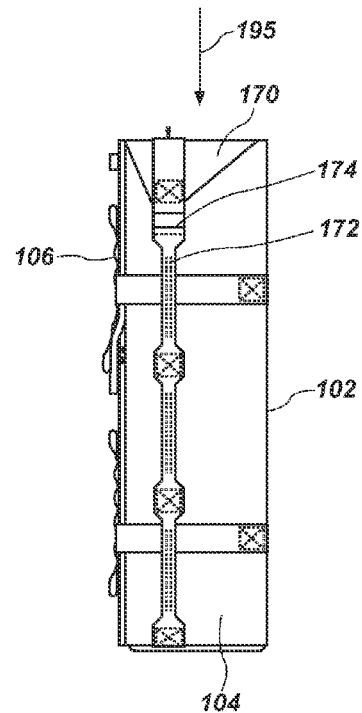
FIG. 5 is a side view of the bag shown in FIG. 1 according to an embodiment of the present disclosure.
Figure 4:
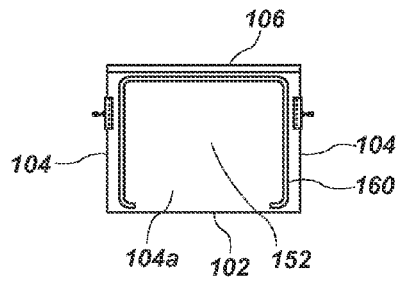
FIG. 4 is a bottom view of the bag shown in FIG. 1 according to an embodiment of the present disclosure.

Referring now to FIGS. 3-5, extending upwardly from the rear panel 102 may be a sidewall 104. The sidewall 104 extend between the front panel 106 and the rear panel 102. The sidewall 104 may define a thickness, $D_4$, of the bag 100. In an embodiment, the thickness, $D_4$, of the bag 100 may be about 9 inches, or between 6 and 14 inches. As best seen in FIGS. 6 and 7, the rear panel 102, the sidewall 104, the first panel 108, and the second panel 110, may define a compartment 105.

Referring now to FIGS. 4, 8 and 9, the tip or end of the bag 100 may include a panel 104a formed in the sidewall 104 that is operable between a closed position (FIG. 4) and an open position (FIGS. 8 and 9). The panel 104a may be secured in the closed position by a zipper 160. The panel 104a may fold down into the open position as shown in FIGS. 8 and 9 to form an extension to the compartment 105. That is, when folded down, the panel 104a may extend the size of the compartment 105 by providing a nose compartment 152. In particular, flexible sidewalls 104b may form the nose compartment 152 that is extends from, and is connected to, the main compartment 105. It will be appreciated that the nose compartment 152 is configured and adapted to accommodate the nose or snout of a larger big game animal, such as an elk or moose.

Referring to FIGS. 8-10, as previously mentioned, the first panel 108 and the second panel 110 may form an overlap portion 150 when in the closed position. In particular, the first panel 108 may overlap the second panel 110. In an embodiment, one side of the sliders of the zippers 140 and 142 may be disposed along the same track or row of teeth formed along a top edge 104b of the wall 104. The other side of the sliders of the zippers 140 and 142 may be disposed on different tracks or rows of teeth. In particular, one side of slider of the zipper 140 may be disposed in a track located along the edge 108a of the first panel 108. Likewise, one side of the slider of the zipper 142 may be disposed in a track located along an edge 110a of the second panel 110. It will be appreciated that this zipper configuration allows some adjustability in the length, $D_3$, of the bag 100 as will be explained in more detail hereinafter.

Referring now to FIG. 7, disposed within the compartment may be a watertight tub 200. In particular, the tub 100 may extend from the top of the sidewall 104 and across the rear panel 102. In an embodiment, the tub 200 may be formed of a flexible, watertight membrane material. In an embodiment, the tub 200 may extend into the nose compartment 152. Further, disposed along the sidewall 104 may be pockets 180. In an embodiment, the pockets 180 may be configured and adapted to receive ice or another cooling substance, such as chemical ice packs, to cool the items placed in the compartment 105.

Referring back to FIGS. 1 and 5, the bag 100 may comprise compression panels 170 that allow the dimensions of the bag 100 to be varied between the top edge 112a and the bottom edge 112b to shorten the bag 100 for smaller game such as antelope and deer. In particular, the compression panels 170 may include buckle straps 172 to shorten the bag 100. A buckle 174 may be utilized to tighten or loosen the straps 172. It will be appreciated that tightening the straps 172 compresses the bag 100 at the panels 170 in the direction shown by the arrow marked with the reference numeral 195.

Referring to FIG. 1, it will be appreciated that the straps 120 articulate to allow antlers extending through the antler ports to be moved in different locations. Thus, the straps 120 may be utilized to secure antlers extending form the antler ports in place. In an embodiment, the bag 100 is insulated. For example, the rear panel 102, the wall 104, the first panel 108 and the second panel 110 may comprise an insulating material, including a flexible material.

Figure 11A:
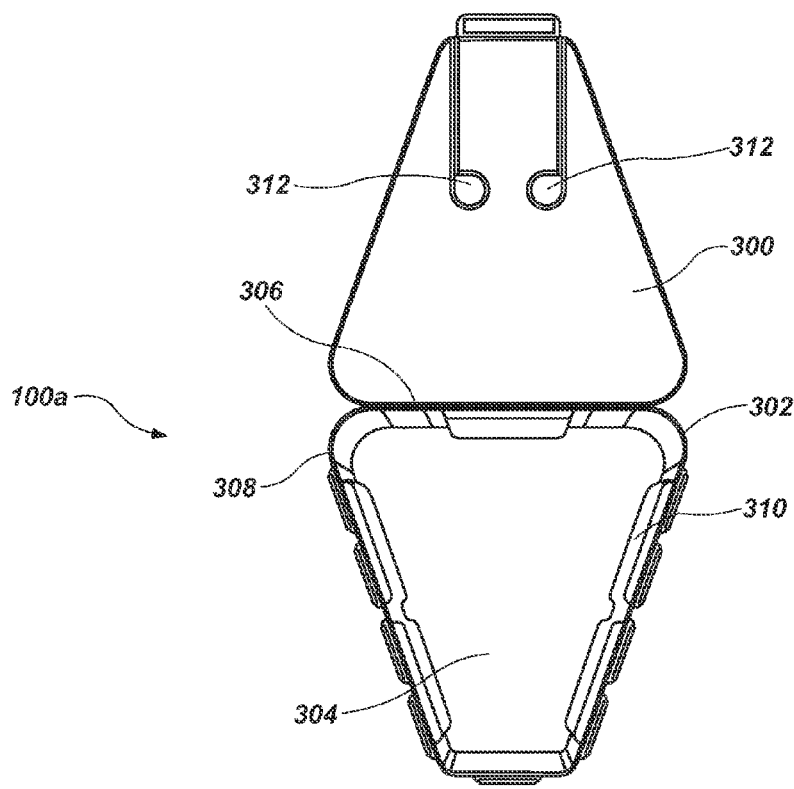
FIG. 11A is a top view of a bag having a single panel operated to an open position according to an embodiment of the present disclosure.
Figure 11B:
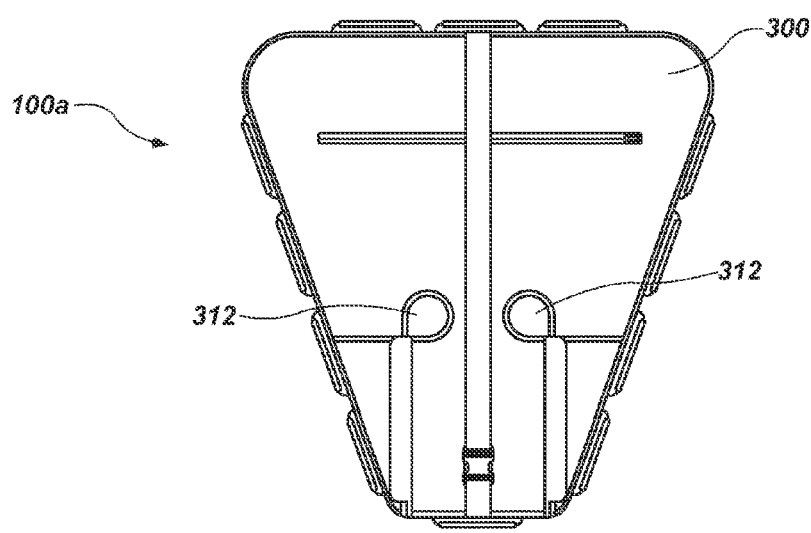
FIG. 11B is a top view of the bag shown in FIG. 11 having a single panel operated to an open position according to an embodiment of the present disclosure.
Figure 12:
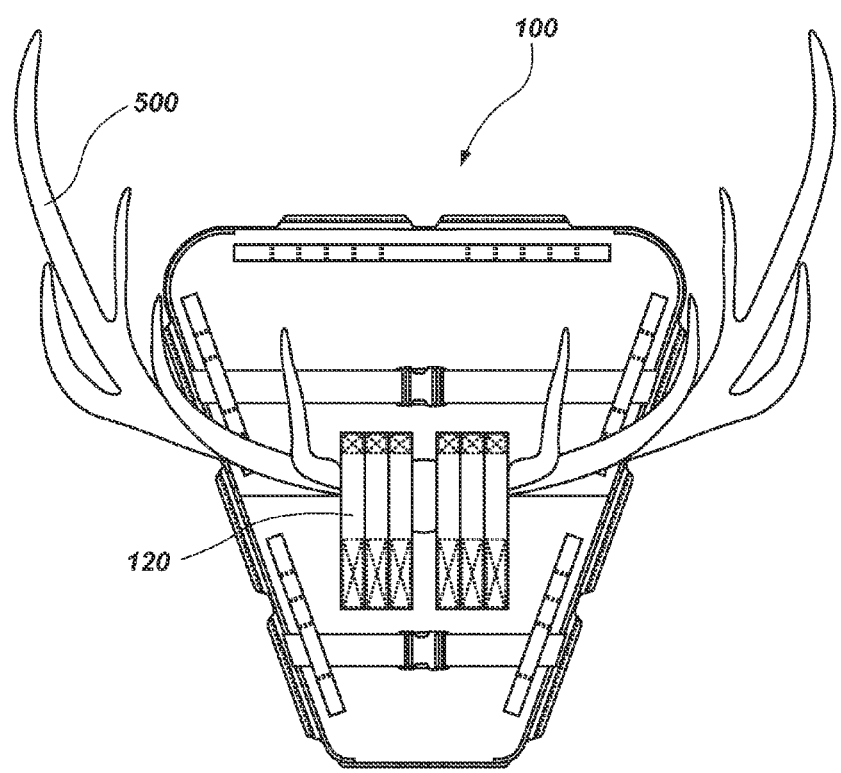
FIG. 12 is a view of the bag shown in FIG. 1 holding an animal cape, head, and antlers.

Referring now to FIGS. 11A and 11B, there is depicted a bag 100a for storing a cape of a big game animal. The bag 100a may include a front panel 300 attached to a sidewall 302 along a top edge 306 of the sidewall 302 by a living hinge. The sidewall 302 may extend upwardly from a rear panel 304. Disposed along the top edge of the sidewall 302 may be a securing member 308 to secure the front panel 300 in a closed position as shown in FIG. 12. In an embodiment, the securing member 308 may be a zipper. Formed in the front panel 300 may be antler ports 312. Ice Pockets 310 may be disposed along an inner surface of the sidewall 302.

Referring now back to FIG. 7, there is shown an outline of an animal head 250 placed into the compartment 105 of the bag 100. The cape or hide 252 of the animal may be disposed above the head 250. Referring now to FIG. 12, there is shown antlers 500 of a big game animal extending from the antler ports in the front panel 106 of the bag 100. The straps 120 may be utilized to secure the antlers 500 in place as shown in FIG. 12. The bag 100 may be placed on a user's back similar to a backpack. In an embodiment, the antler ports 117 and 119 may be combined into a single antler port or at least one antler port. In an embodiment, the bags disclosed herein may be formed of a flexible material.

Those having ordinary skill in the relevant art will appreciate the advantages provide by the features of the present disclosure. For example, it is a feature of the present disclosure to provide a bag for storing a cape of a big game animal. Another feature of the present disclosure to provide such an adjustable bag with ports to accommodate the antlers of a big game animal.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for holding a cape of a big game animal, said apparatus comprising:

a rear panel having a perimeter;
a wall extending upwardly from the rear panel, the wall having a top edge;
the wall and the rear panel defining a compartment;
a front panel disposed over the compartment, the front panel having at least one antler port configured and dimensioned to accommodate antlers of the big game animal;
the front panel comprising a first panel and a second panel, each of the first and second panels operable between an open and a closed position, the first and second panels forming an overlap portion when in the closed position;
a first track of zipper teeth disposed along the top edge of the wall;
a second track of zipper teeth disposed along a perimeter of the first panel;
a third track of zipper teeth disposed along a perimeter of the second panel;
a first slider engaging the first track of zipper teeth and the second track of zipper teeth; and
a second slider engaging the first track of zipper teeth and the third track of zipper teeth;
wherein the first slider is operable to selectively interlock the first and second tracks of zipper teeth;
wherein the second slider is operable to selectively interlock the first and third tracks of zipper teeth;
wherein the second and third tracks of zipper teeth are not interconnected;
wherein the second and third tracks of zipper teeth extend into the overlap portion when the first and second panels are in the closed position.

2. The apparatus of claim 1, the first panel having a first edge, the first edge of the first panel attached to the top edge of the wall, the second panel having a first edge, the first edge of the second panel attached to the top edge of the wall.

3. The apparatus of claim 2, wherein the first edge of the first panel and the first edge of the second panel are attached to the top edge of the wall on opposite sides of the compartment.

4. The apparatus of claim 3, wherein the at least one antler port comprises a first antler port and a second antler port; and wherein the first panel comprises a second edge, the second edge comprising a pair of notches, and wherein the second panel comprises a second edge, the second edge comprising a pair of notches, and wherein the pair of notches in the second edge of the first panel and the pair of notches in the second edge of the second panel collectively define the first antler port and the second antler port.

5. The apparatus of claim 4, further comprising a first set of webbing members extending across the first port and a second set of webbing members extending across the second port.

6. The apparatus of claim 1, further comprising a plurality of ice pockets disposed inside of the compartment.

7. The apparatus of claim 6, wherein the plurality of ice pockets are disposed on an interior surface of the wall.

8. The apparatus of claim 1, wherein the compartment is tapered.

9. The apparatus of claim 8, wherein the compartment comprises a first edge and a second edge, the first edge is between about 18 inches and 30 inches and the second edge is between about 8 inches and 14 inches.

10. The apparatus of claim 1, further comprising a pair of compression straps disposed on the wall.

11. The apparatus of claim 1, further comprising backpack straps.

12. The apparatus of claim 1, further a comprising a panel formed in the wall that is operable between a closed position and an open position.

13. The apparatus of claim 12, wherein the panel expands the compartment when in the open position.

14. The apparatus of claim 1, further comprising a flexible, watertight membrane disposed in the compartment.

15. The apparatus of claim 1, further comprising a plurality of pockets disposed within the compartment.

16. An apparatus for holding a cape of a big game animal, said apparatus comprising:
   a rear panel having a perimeter;
   a wall extending upwardly from the rear panel, the wall having a top edge;
   the wall and the rear panel defining a compartment;
   a front panel disposed over the compartment, the front panel having at least one antler port configured and dimensioned to accommodate antlers of the big game animal;
   a means for expanding the compartment, wherein the means for expanding comprises a panel formed in the wall that is operable between a closed position and an open position, wherein the panel is co-planar with the wall when in the closed position and is co-planar with the rear panel when in the open position; and
   a means for securing antlers extending from the at least one antler port.

17. The apparatus of claim 16, further comprising a top edge and a bottom edge; and further comprising a means for compressing the top edge towards the bottom edge.

18. The apparatus of claim 16, wherein the front panel and the rear panel are tapered.

19. A method of preserving a cape of a big game animal, said method comprising:
   providing a bag, the bag comprising:
      a rear panel having a perimeter,
      a wall extending upwardly from the rear panel, the wall having a top edge,
      the wall and the rear panel defining a compartment,
      a panel formed in the wall that is operable between a closed position and an open position,
      wherein the panel is co-planar with the wall when in the closed position and is co-planar with the rear panel when in the open position,
      wherein a size of the compartment is increased when the panel is in the open position,
      a front panel disposed over the compartment, the front panel having at least one antler port configured and dimensioned to accommodate antlers of the big game animal; and
   placing the cape of the animal in the bag such that the antlers extend from the at least one antler port in the front panel.

* * * * *